United States Patent [19]

Bury

[11] Patent Number: 4,843,539

[45] Date of Patent: Jun. 27, 1989

[54] INFORMATION TRANSFER SYSTEM FOR TRANSFERRING BINARY INFORMATION

[75] Inventor: Joachim Bury, Amberg, Fed. Rep. of Germany

[73] Assignee: Siemens Aktiengesellschaft, Berlin & Munich, Fed. Rep. of Germany

[21] Appl. No.: 8,783

[22] Filed: Jan. 29, 1987

[30] Foreign Application Priority Data

Feb. 6, 1986 [DE] Fed. Rep. of Germany ....... 3603751

[51] Int. Cl.[4] .......................................... G06F 13/00
[52] U.S. Cl. .................................................. 364/200
[58] Field of Search ............. 365/78; 377/75; 370/86; 364/200 MS File, 900 MS File

[56] References Cited

U.S. PATENT DOCUMENTS

| | | | |
|---|---|---|---|
| 2,957,163 | 10/1960 | Kodis | 364/900 |
| 3,713,096 | 1/1973 | Comfort et al. | 364/200 |
| 3,913,072 | 10/1975 | Catt | 364/900 |
| 3,992,699 | 11/1976 | Krumbach | 365/78 |
| 4,048,673 | 9/1977 | Hendrie et al. | 364/200 |
| 4,144,561 | 3/1979 | J'' et al. | 364/200 |
| 4,179,747 | 12/1979 | Dlugos | 364/900 |
| 4,193,121 | 3/1980 | Fedida et al. | 364/900 |
| 4,333,161 | 6/1982 | Catt | 364/900 |
| 4,334,305 | 6/1982 | Girardi | 370/86 |
| 4,438,491 | 3/1984 | Constant | 364/200 |
| 4,641,276 | 2/1987 | Dunki-Jacobs | 364/900 |

FOREIGN PATENT DOCUMENTS 3303826 8/1984 Fed. Rep. of Germany .
1369305 10/1974 United Kingdom .

OTHER PUBLICATIONS

IBM Technical Disclosure Bulletin, vol. 15, No. 1, Jun. 1972, pp. 1-3.

Primary Examiner—Gary V. Harkcom
Assistant Examiner—Christopher H. Lynt
Attorney, Agent, or Firm—Kenyon & Kenyon

[57] ABSTRACT

An information transfer system for transferring binary information between a central unit and modular peripheral assemblies via a bus system. The bus system is designed as a serial ring shift register. An interface unit which permits parallel transfer of the individual binary information is interposed between the peripheral assembly and the bus.

22 Claims, 4 Drawing Sheets

INFORMATION TRANSFER SYSTEM FOR TRANSFERRING BINARY INFORMATION

BACKGROUND OF THE INVENTION

The present invention relates to an information transfer system for transferring binary information between a central unit and modular peripheral assemblies via a bus system.

In known systems of the above-mentioned type (DE-OS No. 33 03 826), a parallel bus system is provided and in the peripheral assemblies, additional decoding devices are necessary.

SUMMARY OF THE INVENTION

According to the invention, a system of the above-mentioned type is to be provided which can be produced costeffectively, is space-saving and can be expanded in modular fashion, and is particularly well suited for small automating equipments.

This is achieved in a simple manner by the provision that the bus system is designed as a serial ring shift register and that between the peripheral/assembly and the bus, an interface unit is interposed which permits parallel transfer of the binary information. A further simplification is obtained if the interface unit comprises two each sub-units with four each information bits or the interface unit is realized by means of integrated circuits (IC), preferably in CMOS technology. A further reduction of the space required is obtained if the interface unit is provided at the plug-in location for the peripheral assembly. Addressing and information transfer with a small amount of technical means can be achieved if the interface units are associated with four control lines of which one sets the bus to a defined starting state (CLEAR), a second one switches the function of the ring shift register from serial shifting to parallel transfer ($\overline{\text{LATCH}}$), a third one carries out switching between peripheral assembly identification and parallel inputs of the shift register ($\overline{\text{IDENT}}$), and the fourth one gives the operating clock frequency (CLOCK). It is of further advantage if the third switching ($\overline{\text{IDENT}}$) determines the type of function by means of the peripheral assembly identification. A further simplification regarding the time required for the transfer of information can be achieved if the interface unit comprises a write/read amplifier capable of tristate operation. Advantageously, a fifth information controls the parallel transfer of the binary information. It is of further advantage to provide an interim memory. In order to monitor the proper operation of the bus system in a simple manner it is of further advantage if each sub-unit of the ring shift register is followed by an additional fifth information which serves for bus self-monitoring. In this connection it has been found to be of advantage if the fifth information is generated by a peripheral assembly which feeds the information to the ring shift register. An expansion of the information system without rewiring the hardware can be achieved if the two sub-units can be connected to form a separate ring shift register via switching means provided at the terminal ends. There, it has been found to be advantageous for coupling if the switching means are formed by tristate amplifiers. Instead of shift registers with 4-bit information content, shift registers with greater information content can be used without difficulty if tristate amplifiers are provided in the interface unit which are operative in dependence on a further interface unit plugged-in parallel to the interface unit. Thereby, the interface unit provided in the system is disabled without additional cost. Adaptation to any application can be achieved if two or more ring shift register can be coupled via switching means provided at the terminal ends to form an enlarged ring shift register. So that an enlarged information volume can be processed, it is of advantage is each sub-unit also of the enlarged ring shift register can be shunted by a shift register with a bit number larger than the sub-unit. So that the bridging state of individual interface units can be detected readily, it is of advantage if at the bridging point, a device for obtaining a predetermined signal state is provided which is operative if the shift register is removed. In order to avoid misinformation, it is furthermore advantageous if a blocking device for blocking the transfer of the disturbed ring shift register information is provided. It has been found to be an advantageous procedure for detecting and correcting an interruption with the shift register pulled if, when the predetermined signal state becomes operative, the central unit recognizes the interruption by means of the signal state and executes an $\overline{\text{INDENT}}$ cycle for reactivating the switched-off sub-unit in the interface. As a method for carrying out the information transfer in such a system, it has been found to be advantageous if information is transported serially by the central unit from a loading memory via the bus and in a further memory, the state data of the peripheral assemblies are loaded simultaneously and the program processing takes place in the subsequent dwelling time, the actual information being transferred by the peripheral assemblies before and after the serial transport. So that also the state of the bus system can be recognized with the method according to the invention, it is furthermore, advantageous if, prior to the information transport, at least an integral multiple of the information quintent is loaded as the head code (preamble) in the system, which is checked by the central unit after the counted register steps are completed.

BRIEF DESCRIPTION OF THE DRAWINGS

The invention will be explained in greater detail in the following detailed description, with reference to the drawings, in which.

DETAILED DESCRIPTION

Figure 1:
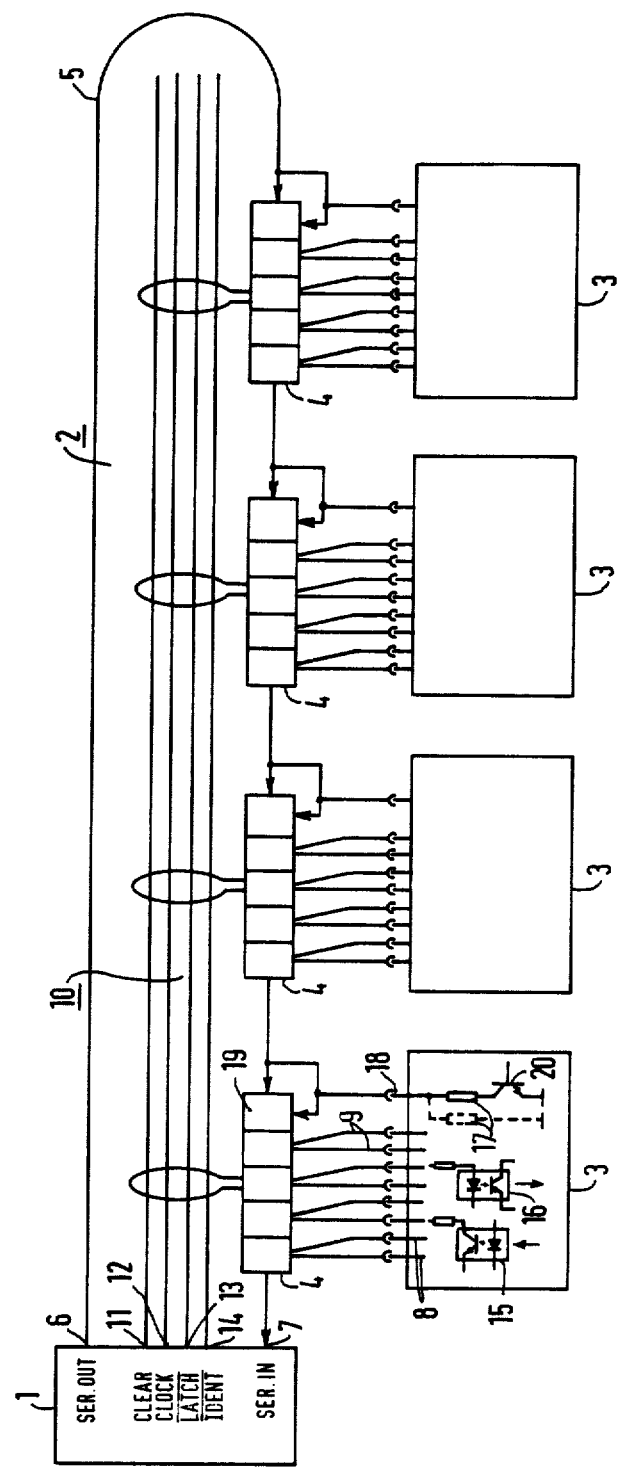
FIG. 1 shows a basic presentation of the information transfer system with a serial ring shift register and an interface unit interposed between the peripheral assembly and the bus.

The information transfer system shown in FIG. 1 consists of the central unit 1, also called CPU; the bus system 2 and the peripheral assemblies 3. The interface units 4 connecting the bus system 2 and the peripheral assemblies 3 are designed as a ring shift registers and connected to each other via the data ring line 5. The data ring line is fed at point 6 (serial out) and stored at point 7 (serial in) in the memory of the central control unit. The interface unit 4 contains generally a shift register with four bits, indicated by the four boxes in FIG. 1, which is connected to the peripheral assembly 3 via plug contacts 8 for the output or transfer of information, and to plug contacts 9 for the transfer of identifying (code) signals, as will be explained later on. Furthermore, the control bus 10 which consists of the four control lines 11, 12, 13, and 14, is connected to the interface unit 4. The control line 11 carries the so-called CLEAR signal; the control line 12, the so-called CLOCK signal; the control line 13, the $\overline{\text{LATCH}}$ signal and the control line 14, the $\overline{\text{IDENT}}$ signal. Depending on these four control lines, the data are shifted on the data ring line or transferred in parallel. The information flow direction is preset at an interface unit 4 by the transfer of identification signals from the peripheral assembly to the serial bus decoder. Thus, the interface unit 4 can service selectably an input, output or mixed I/O (times, counters). With four/code signals, up to sixteen different types of assemblies can be detected. The code and the operation of the serial bus decoder determined thereby is stored after identification. Only a new code causes a resetting of the serial bus decoder. The codes can also be stored as data on the ring shift register. Their evaluation supplies an image of the peripheray to the CPU. The bus is loaded serially via the feeding point 6. In one data cycle, all shift register information is pushed through.

The preceding state of the bus is read-in at the same time. Prior to and after each data cycle, the current information is transferred by the command "load in parallel". Each sub-unit of the ring shift register contains, after a data cycle, a meassage consisting of five units of information. The fifth bit serves for self-monitoring and error diagnosis. During the reading-in the serial input of the shift regiter is imaged on the fifth bit (true bit=TB). The messages for different peripheral assemblies can look as follows:

Message to an output module

| A0 | A1 | A2 | A3 | TB |

0: Information A0 . . . A3 is correct and is read out,

1: Information A0 . . . A3 is not correct and is not read out.

Message from an output assmbly

| J0 | J1 | J2 | J3 | TB |

0: Reverse information of the output assembly is correct,

1: Case of a disturbance; the information J0 . . . J3 is invalid.

Message to an input assembly

| x | x | x | x | 1 |

The input assembly confirms the correctness of its transferred data by rewriting the TB into 0.

Message from an input assembly

| E0 | E1 | E2 | E3 | TB |

0: E0 . . . E3 are true
1: The information E0 . . . E3 are invalid.

Message in the $\overline{\text{IDENT}}$ run (only read-in)

| K0 | K1 | K2 | K3 | KA |

The message contains the codes which are transferred by the peripheral assemblies to the interface unit.

Message to an empty location

| 1 | 1 | 1 | 1 | 0 |

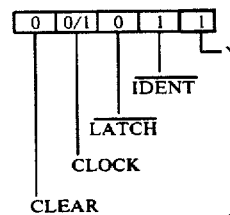

Reply from the empty location; control bit is rewritten, instant transfer of the control signals to P0 . . . P3.

The codes of the peripheral assembly can look as follows:

| K0/4 | 1/5 | 2/6 | 3/7 | |
|------|-----|-----|-----|---|
| 0 | 0 | 0 | 0 | Two inputs (P0, P1) P2,3) + two |
| 0 | 0 | 0 | 1 | outputs (not retrievable) |
| 0 | 0 | 1 | 0 | |
| 0 | 0 | 1 | 1 | |
| 0 | 1 | 0 | 0 | Four input types, standard input |
| 0 | 1 | 0 | 1 | |
| 0 | 1 | 1 | 0 | |
| 0 | 1 | 1 | 1 | |
| 1 | 0 | 0 | 0 | Four output, output amplifiers of |
| 1 | 0 | 0 | 1 | the D-flip-flops S, |
| 1 | 0 | 1 | 0 | with reading back; S, |
| 1 | 0 | 1 | 1 | without readback are switches into tristate for LATCH —0, read back; |
| 1 | 1 | 0 | 0 | Ecternal register with external code |
| 1 | 1 | 0 | 1 | External shift register, input 8 bits |
| 1 | 1 | 1 | 0 | External shift register, output 8 bits |
| 1 | 1 | 1 | 1 | Empty location |

In the peripheral assembly 3, optical couplers 15, 16 are brought into connection with the plug terminals 8. The optical couplers 15 make it possible to read-in information from the periphery and the optical coupler 16, reading of information toward the periphery. A pull-down resistor 17 cooperates via the plug-in terminal 18 with a monitoring bit 19 which indicates the presence of the assembly. A plugged-in assembly transfers a zero with a pull-down resistor. Thereby, the transferred data in the message are characterized as true. If the pull-down resistor 17 is connected via a transistor 20, the transferred data bit can be varied additionally.

Figure 2:
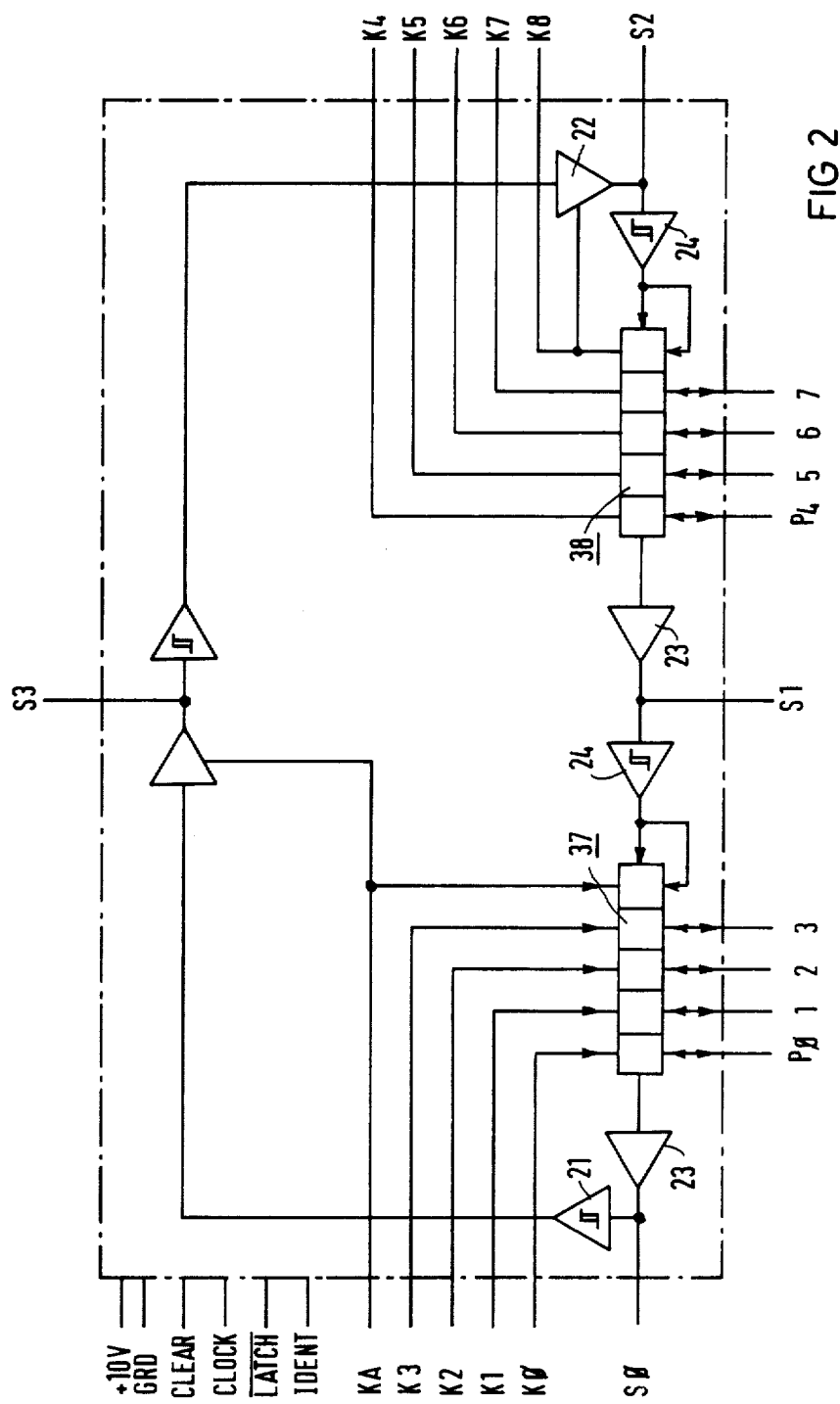
FIG. 2 shows the design of the interface unit as a ring component which contains two interface units.
Figure 3:
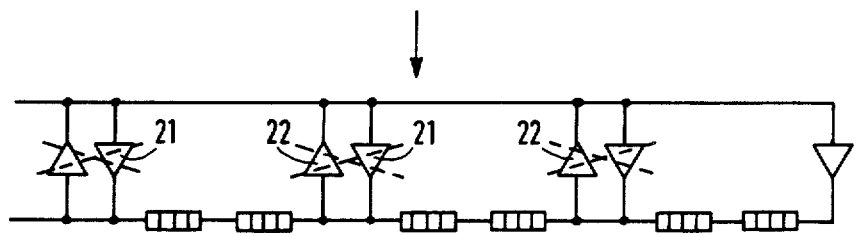
FIG. 3 shows an arrangement for coupling the ring components according to FIG. 2, to obtain the serial ring shift register.

The detailed design of the interface unit 4 can be seen in FIG. 2. There, two shift registers 4 are combined as sub-units 37, 38 to form a ring component which comprises amplifiers 21, 22 which are preferably designed as tristate amplifiers. Isolation amplifiers 23, 24 which are likewise realized as tristate amplifiers, allow the possibility to shunt a further interface unit across the interface unit 4 which may optionally contain more than 4 or 5 bits. The internal shift register is thereby disabled and shunted by an external shift register. This switching of paths is done in the $\overline{\text{IDENT}}$ cycle. Thereby, the data ring can be enlarged in any way desired by corresponding codes. The amplifiers 21, 22 cause the termination of the serial bus system, as is indicated in FIG. 3. If the several ring components according to FIG. 2 are coupled to each other, the shunt-connected amplifiers 21, 22 are switched to "inflate resistance", i.e., to "tri state" if tristate amplifiers are used. Thereby, an expansion of the information transfer system is possible without difficulty. Every serial coupling point is bidirectional. In parallel loading, the serial input of the shift register is additionally loaded as the fifth bit (true bit). The preceding drive is in "tristate". Like the ports, also the serial I/O's have internal pullup resistors.

Figure 4:
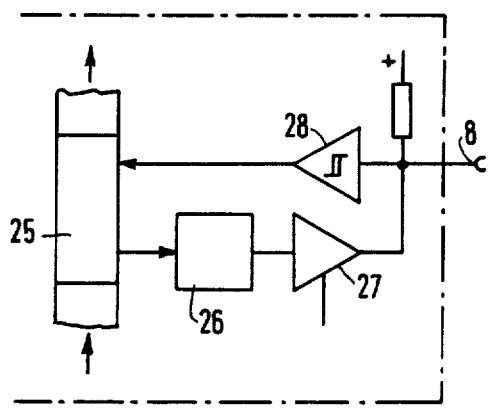
FIG. 4 shows a circuit diagram for supplementing the interface unit for using the same for input and output of information.
Figure 5:
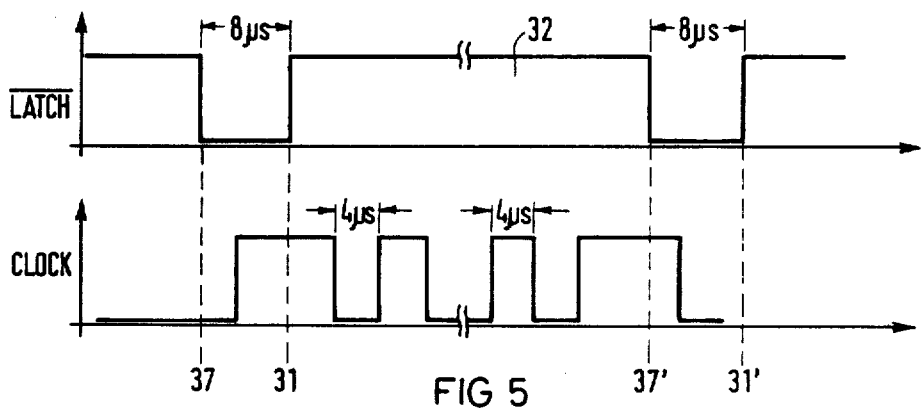
FIG. 5 shows the control of the data flow by the control commands CLOCK and $\overline{\text{LATCH}}$ in the timing diagram.

In FIG. 4, a shift register cell 25 of the interface unit 4 is shown. It is connected to the contacts 8 on the one hand via an intermediate memory 26 and a tristate amplifier 27 and, on the other hand, in the opposite direction via an amplifier 28. The interface can be used for the input and output of information. For reading, the output amplifier must be in "tristate". The control of the customer circuit for information transfer with the signals $\overline{\text{LATCH}}$ and CLOCK is shown in FIG. 5. There, the wave shape of the signal "parallel loading" ($\overline{\text{LATCH}}$) and (CLOCK) is shown one below the other. At the time 37, the output amplifier 27 is switched to "tristate". At the time 29, data are read in. At the time 30, data are written into the interim memory and at the time 31, the output amplifier 27 is enabled again. The data cycle is designated with 32.

Figure 6:
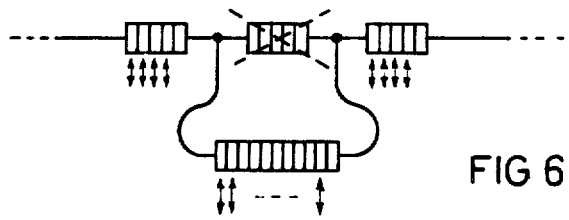
FIG. 6 shows an arrangement using a shift register with more than four bits.
Figure 7:
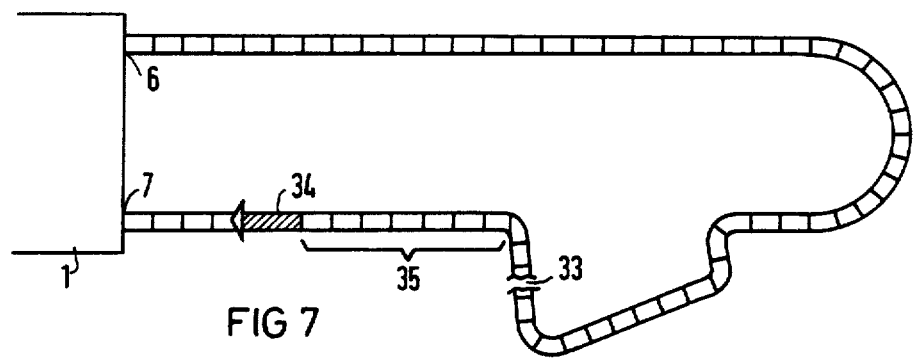
FIG. 7 shows the presentation in principle of disturbed operation.

If more than 4 bits are required per interface unit, the internal ring shaft register can be disabled and shunted by an external fifth register with a larger number of bits, as shown in FIG. 6. The switching of paths occurs in the IDENT cycle. The codes 1101 and 1110 characterize external shift registers for 8E or 8A peripheral assemblies with a length of 10 bits. During the $\overline{\text{IDENT}}$ run, the shift register in the bus module is operative and takes over the codes above. During the data cycle, the information goes in full via the external shift register. The code 1100 disconnects the serial bus decoder totally. The external shift register also takes over the placement of the code. After 1100, any desired parameter can be transferred to the central unit and determine the type and length of the message traffic in operation. If modules are pulled or plugged-in during operation, the central unit registers a change of the signal from 0 to 1 or vice versa. Thereby, an $\overline{\text{INDENT}}$ cycle is excited which determines the new periphery configuration. During the $\overline{\text{IDENT}}$ run, the command output is blocked; the sate of the outputs remains unchanged. When 5-bit periphery modules are pulled and plugged-in, the ring line is not disturbed; on the other hand, pulling external bit registers cuts the ring line open. This disturbance must be recognized by the central unit immediately and trigger an $\overline{\text{IDENT}}$ run. The signal state of other output modules must not be influenced. Critical is the interruption of a running data cycle (message). Here, the central unit sends ahead a preamble and counts the clock pulses. A cut-open data line fills a running bus message with 111 ... as is shown in principle in FIG. 7. Here, the pulled module is indicated by the interruption point 33. The defined preamble of the message has the reference symbol 34. Between the preamble 34 and the interruption point 32 is located the disturbed region 35 which is filled with 111 .... Thereby, the disturbed end of the message is recognized as "not true" and is not read out, i.e., the states of the concerned outputs remain unchanged. The immediately following $\overline{\text{IDENT}}$ cycle re-establishes the data path via the previously disabled internal ring shift register. If modules are pulled in during operation, the change of the fifth bit from 1 to zero is registered by the central unit. An $\overline{\text{IDENT}}$ cycle takes place which determines the new periphery configuration. When external shift registers are plugged in, they remain in "tristate" until an $\overline{\text{IDENT}}$ cycle communicates to the shift register in the bus module its change in function. After the $\overline{\text{IDENT}}$ run is terminated, the external shift register takes over the data path.

The operation of the information tranfer system can proceed as follows: when the information transfer system starts up, the bus is on "CLEAR", i.e., all outputs, shift registers and interim memories at 1. After the end of the "CLEAR", the central unit dispatches a zero on the serial line 6. It counts the clock pulses until the "0" arrives at the serial input 7 and has thereby determined the overall bus development. Subsequently, with $\overline{\text{IDENT}}$=0, the respective peripheral assembly codes are put in place. In the following $\overline{\text{IDENT}}$ cycle, the central umnit gives the output "1" and reads the codes in. By means of this code list, the central unit knows how the messages must be structured. During the first data cycle the central unit reads the applied inputs and again delivers only "1". After the subsequent program cycle, all output values are transferred simultaneously in the data cycle and all inputs values are read in. The following control signals apply here.

CLEAR=1
  sets all shift registers to "1"
  set outputs of the D-flip-flops to "1"
  switches amplifiers of the serial outputs S and SI in tristate
  asynchronous; blocks all control signals (for internal operation)

$\overline{\text{IDENT}}$=0
  makes code $\overline{\text{LATCH}}$ transparent
  switches parallel inputs S1, P ... P3 of the shift register to KA, K ... K3
  locks inputs of the D-flip-flops
  does not influence the ports $\overline{\text{LATCH}}$=0
  switches shift register to "parallel loading"
  releases inputs of the D-flip-flops
  switches the amplifiers of the serial outputs to tristate (—inputs for true/alarm bits)
  switches (only in the case of 4-bit outputs) ports to tristate—read back. (in the case of the function 2E/2A, reading takes place from the input of the output amplifier)

CLOCK⌐

—D-flip-flops take over the content of the shift register if: true bit=0 and $\overline{\text{LATCH}}$=0 and $\overline{\text{IDENT}}$=1 and CLEAR=0

CLOCK ⌐

—shift register is to be loaded ($\overline{\text{LATCH}}$=0) shift intormation serially ($\overline{\text{LATCH}}$=1).

Figure 8:
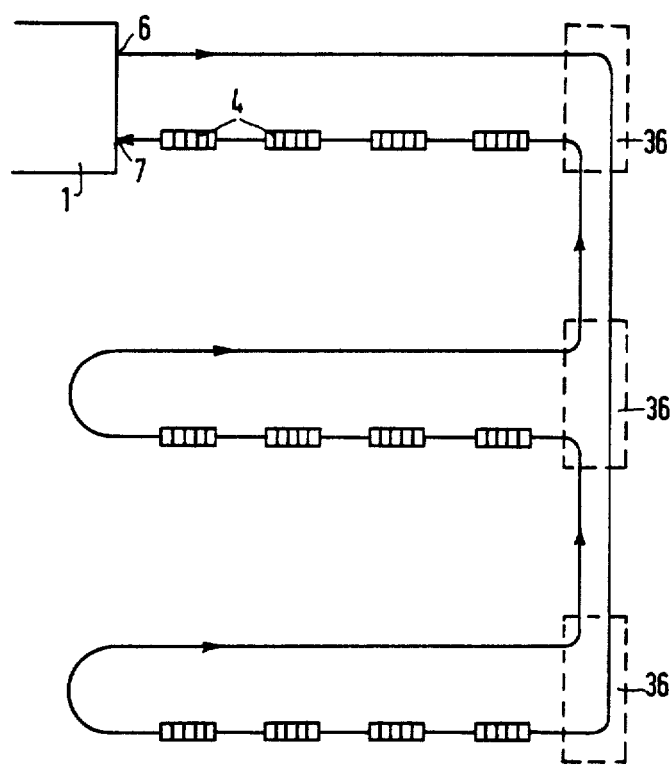
FIG. 8 shows an arrangement for expanding the system according to the invention, using an expansion assembly.

The bus system according to the invention can also be opened at the end of the first line by an expansion module 36 and connected to a further line as can be seen in FIG. 8. Thereby, short connecting lines are obtained with consecutive plug location numbering. With the information transfer system according to the invention, a cost-effective, space saving bus system is obtained which can be expanded in modular fashion and can also find application for small automation equipment, The system can be realized in an IC specific for each customer in C-MOS technology as the smallest ring component, so that the decoding costs in the peripheral module are eliminated. No terminating plugs are required. Empty locations are possible without shifting the address. The peripheral modules can be exchanged in operation.

In the foregoing specification, the invention has been described with refernce to specific exemplay embodiments thereof. It will, howewver, be evident that various modifications and changes may be made thereunto without departing from the broader spirit and scope of the invention as set forth in the appended claims. The specifications and drawings are, accordingly, to be regarded in an illustrative rather than in a restrictive sense.

What is claimed is:

1. An information transfer system for transferring binary information between a central unit and a plurality of modular peripheral assemblies via a bus system, wherein the bus system comprises a serial ring, and further comprises an interface unit comprising a shift register of said serial ring associated with each peripheral assembly which permits parallel tranfer of the binary information between each peripheral assembly and the bus system, each said interface unit being disposed in the serial ring and having parallel outputs and inputs coupled to a respective peripheral assembly, said bus system further comprising a plurality of control lines for controlling said interface units, each said interface unit comprising two sub-units, each sub-unit comprising four information bits, and further comprising first switching means provided at terminal ends of each interface unit allowing serial outputs and inputs of said interface units to be coupled together to form a ring shift register, and further comprising second switching means provided at said terminal ends for coupling said interface units together to form an enlarged ring shift register.

2. The system recited in claim 1, wherein said interface unit comprises at least one integrated circuit.

3. The system recited in claim 2, wherein said integrated circuit comprise CMOS technology.

4. The system recited in claim 1, wherein each interface unit is provided in a plug-in location for the peripheral assembly.

5. The system recited in claim 1, wherein four control lines are provided coupled to each interface unit.

6. The system recited in claim 5, wherein, of the four control lines, one sets the bus system to a defined starting state (CLEAR), a second one switches the function of the serial ring shift register from serial shifting to parallel transfer (LATCH), a third one carries out switching between peripheral assemblies and parallel inputs of the shift register (IDENT) and the fourth one provides an operating clock frequency (CLOCK).

7. The system recited in claim 6, wherein the third control line (IDENT) determines the type of function by a code stored in the respective peripheral assembly.

8. The system recited in claim 6, wherein the interface unit comprises a tristate write/read amplifier.

9. The system recited in claim 8, wherein the interface unit reads back the output of the tristate write/read amplifier.

10. The system recited in claim 1, wherein each sub-unit of the serial ring shift register comprises an additional fifth information bit which serves for self-monitoring of the bus system.

11. The system recited in claim 10, wherein the fifth information bit is generated by a respective peripheral assembly, said respective peripheral assembly feeding information to the serial ring shift register.

12. The system recited in claim 11, wherein the fifth information bit controls the parallel transfer of the binary information under control of said third control line.

13. The system recited in claim 1, wherein the switching means comprises tristate amplifiers.

14. The system recited in claim 1, wherein each interface unit comprises a plurality of tristate amplifiers which are operative as a function of a further interface unit plugged parallel to the respective interface unit.

15. The system recited in claim 1, wherein each sub-unit of the enlarged ring shift register can be shunted by a shift register with a bit number larger than that of the sub-unit.

16. The system recited in claim 15, wherein at the shunting point, a device for obtaining a predetermined signal state is provided which is operative if the shift register is removed.

17. The system recited in claim 15, wherein a blocking device for blocking the transfer of disturbed ring shift register information is provided.

18. A method for detecting and correcting an interruption of a data ring of an information transfer system for transferring binary information between a central unit and a plurality of modular peripheral assemblies via a bus system wherein the bus system comprises a serial ring and further having an interface unit comprising a shift register of said serial ring associated with each peripheral assembly which permits parallel transfer of the binary information between each peripheral assembly and the bus system, each said interface unit being disposed in the serial ring and having a serial input and serial output connected in the serial ring and parallel outputs and inputs coupled to a respective peripheral assembly, said bus system further comprising a plurality of control lines for controlling said interface units, and further comprising means for obtaining a predetermined signal state which is operative if a shift register is removed from the data ring, wherein, if a shift register is removed from the data ring and if the predetermined signal state become effective, the central unit recognizes the interruption by means of the signal state and carries out an identification cycle for reactiving a switched-off sub-unit in the interface without influencing starting signal states on the data ring.

19. A method for transferring binary information between a central unit and a plurality of modular peripheral assemblies via a bus system wherein the bus system comprises a serial ring and further having an interface unit comprising a shift register of said serial ring associated with each peripheral assembly which permits parallel transfer of the binary information between each peripheral assembly and the bus system, each said interface unit being disposed in the serial ring and having a serial input and serial output connected in the serial ring and parallel outputs and inputs coupled to a respective peripheral assembly, said bus system further comprising a plurality of control lines for controlling said interface units, wherein the central unit makes information serially transferred via the bus system available to the interface units from a loading memory and further having a further memory wherein state data of the peripheral assemblies is loaded simultaneously, program processing taking place subsequently, the binary information being transferred from the peripheral assemblies before and after the serial transfer.

20. The method recited in claim 19, wherein, prior to the transfer of the binary information, at least one integral multiple of the binary information is loaded into the system as a preamble which is checked by the central unit after the completion of a selected number of counted register steps.

21. The method recited in claim 20, wherein said binary information comprises five bits.

22. A method for bidirectional information transfer on a line wherein a shift register cell of a serial ring shift register is coupled to an intermediate memory and an output of the memory is coupled to an input of a tristate amplifier, with an output of the tristate amplifier being coupled back to the shift register cell by a read amplifier comprising switching the tristate amplifier to its tristate condition when a control signal is supplied to the tristate amplifier and activating said read amplifier.

* * * * *